United States Patent
Mori et al.

Patent Number: 5,474,708
Date of Patent: Dec. 12, 1995

[54] PHOSPHOR AND RADIATION IMAGE STORAGE PANEL EMPLOYING THE SAME

[75] Inventors: Nobufumi Mori; Chiyuki Umemoto; Kenji Takahashi, all of Kanagawa, Japan

[73] Assignee: Fuji Photo Film Co., Ltd., Kanagawa, Japan

[21] Appl. No.: 352,343

[22] Filed: Dec. 8, 1994

Related U.S. Application Data

[63] Continuation of Ser. No. 203,641, Mar. 1, 1994, abandoned, which is a continuation of Ser. No. 743,731, Apr. 1, 1988, abandoned, which is a continuation of Ser. No. 687,157, Dec. 28, 1984, abandoned.

[30] Foreign Application Priority Data

Dec. 28, 1993 [JP] Japan ................. 58-247315

[51] Int. Cl.$^6$ ............... C09K 11/61; C09K 11/55
[52] U.S. Cl. ................ 252/301.4 H; 250/493.1
[58] Field of Search ............ 252/301.4 H; 250/483.1

[56] References Cited

U.S. PATENT DOCUMENTS

4,076,897  2/1978  Joiner ................. 252/301.4 H X
4,138,529  2/1979  Mori et al. ............. 252/301.4 H X
4,505,989  3/1985  Umemoto et al. ......... 252/301.4 H X

FOREIGN PATENT DOCUMENTS

95741  12/1983  European Pat. Off. ....... 252/301.4 H

*Primary Examiner*—C. Melissa Bonner
*Attorney, Agent, or Firm*—Sixbey, Friedman, Leedom & Ferguson; Gerald J. Ferguson, Jr.

[57] ABSTRACT

A divalent europium activated barium fluorohalide phosphor having the formula (I):

$$BaFX \cdot aNaX' : xEu^{2+}, yM^I \qquad (I)$$

in which each of X and X' is at least one halogen selected from the group consisting of Cl, Br and I; $M^I$ is at least one alkali metal selected from the group consisting of K, Rb and Cs; and a, x and y are numbers satisfying the conditions of $0 < a \leq 2.0$, $0 < x \leq 0.2$ and $5 \times 10^{-4} \leq y \leq 10^{-2}$, respectively. A radiation image storage panel employing said phosphor is also disclosed.

14 Claims, 1 Drawing Sheet

PHOSPHOR AND RADIATION IMAGE STORAGE PANEL EMPLOYING THE SAME

This application is a continuation of Ser. No. 08/203,641, filed Mar. 1, 1994, now abandoned; which itself is a continuation of Ser. No. 07/743,731, filed Apr. 1, 1988, abandoned; which is a continuation of Ser. No. 06/687,157, filed Dec. 28, 1984, abandoned.

FIELD OF THE INVENTION

This invention relates to a phosphor and a radiation image storage panel employing the same, and more particularly, to a divalent europium activated barium fluorohalide phosphor and a radiation image storage panel employing the same.

DESCRIPTION OF THE PRIOR ART

Recently, it has been found that a divalent europium activated barium fluorohalide phosphor (BaFX:Eu$^{2+}$, in which X is at least one halogen selected from the group consisting of Cl, Br and I) absorbs and stores a portion of radiation energy when exposed to a radiation such as X-rays, and emits light in the near ultraviolet to blue region when excited with an electromagnetic wave within a wavelength region of 450–900 nm after exposure to the radiation, that is, the phosphor shows stimulated emission (the peak wavelength of the stimulated emission is within the region of approx. 885–405 nm, depending upon the kind of halogen which is a component of the phosphor). In particular, the divalent europium activated barium fluorohalide phosphor has been paid much attention and investigated as a stimulable phosphor employable for a radiation image storage panel (i.e., stimulable phosphor sheet) which is used in a radiation image recording and reproducing method utilizing the stimulability thereof.

A radiation image storage panel has a basic structure comprising a support and at least one phosphor layer provided on one surface of the support which comprises a binder and a stimulable phosphor dispersed therein. Further, a transparent protective film is generally provided on the free surface (surface not facing the support) of the phosphor layer to keep the phosphor layer from chemical deterioration or physical shock.

The radiation image recording and reproducing method using the above-described radiation image storage panel comprising the stimulable phosphor is a very advantageous method replacing the conventional radiography. As described, for example, in U.S. Pat. No. 4,289,968, the method involves steps of causing the stimulable phosphor of the panel to absorb radiation energy having passed through an object or having radiated from an object; exciting the stimulable phosphor with an electromagnetic wave such as visible light and infrared rays (hereinafter referred to as "stimulating rays") to sequentially release the radiation energy stored in the stimulable phosphor as light emission (stimulated emission); photo-electrically detecting (reading out) the emitted light to obtain electric signals; and reproducing a visible image from the electric signals on a recording material such as a photosensitive film or on a display device such as CRT.

In the radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

The operation of reading out the radiation energy stored in the radiation image storage panel in the above-described method is carried out by the steps of scanning the panel with a laser beam (stimulating rays) to sequentially excite the stimulable phosphor so as to release the radiation energy stored therein as light emission, and detecting the emitted light by a photosensor such as a photomultiplier.

In the last step of the read-out operation, the light which is continuously emitted by the stimulable phosphor of the radiation image storage panel after terminating the excitation with stimulating rays (namely, afterglow of stimulated emission) causes the decrease of S/N ratio of the resulting image. More in detail, the afterglow given by the phosphor particles other than the phosphor particles aimed to excite is detected as the light emitted by the aimed ones in the case that the phosphor gives afterglow in a relatively high ratio to the amount of stimulated emission. As a result, the image provided by the panel comprising such a stimulable phosphor tends to be deteriorated in the image quality (sharpness, density resolution, etc.).

The afterglow characteristics of the panel varies depending not only on the employed stimulable phosphor but also on the intensity of stimulating rays, the scanning speed in the case of using a laser beam as the stimulating rays, or the like. In practical use, the influence of afterglow on the image quality further varies depending upon the detecting procedure of stimulated emission. Nevertheless, it is of great value to improve the afterglow characteristics of the panel which give an adverse effect to the image quality, even if the improvement is not so high.

The radiation image recording and reproducing method using the radiation image storage panel comprising the stimulable phosphor is a very advantageous method as described above, and the method is desired to show a sensitivity as high as possible. The sensitivity of the panel to a radiation generally increases as the luminance of stimulated emission of the phosphor employed therefor increases. Accordingly, it is desired that the luminance of stimulated emission of the phosphor is as high as possible.

As described in Japanese Patent Provisional Publication No. 59(1984)-56479, the above-mentioned divalent europium activated barium fluorohalide phosphor is improved in the luminance of stimulated emission by incorporating a specific amount of sodium halide thereinto. More in detail, the divalent europium activated barium fluorohalide phosphor containing sodium halide and having the formula:

BaFX.aNaX':xEu$^{2+}$ in which each of X and X' is at least one halogen selected from the group consisting of Cl, Br and I; and a and x are numbers satisfying the conditions of $0<a\leq 2.0$ and $0<x\leq 0.2$, respectively, gives stimulated emission of higher luminance than the divalent europium activated barium fluorohalide phosphor containing no sodium halide. However, the incorporation of sodium halide into the divalent europium activated barium fluorohalide phosphor tends to deteriorate the afterglow characteristics of stimulated emission thereof, The divalent europium activated barium fluorohalide phosphor containing sodium halide with the above formula is desired to be improved in the afterglow characteristics.

SUMMARY OF THE INVENTION

It is an object of the present invention to provide a divalent europium activated barium fluorohalide phosphor containing sodium halide which is improved in the afterglow characteristics without considerably decreasing the luminance of stimulated emission.

It is another object of the present invention to provide a radiation image storage panel which is improved in the quality of the image provided thereby without considerably decreasing the sensitivity.

The present inventors have studied on the divalent europium activated barium fluorohalide phosphor containing sodium halide, and as a result, they have found that the afterglow characteristics of the phosphor can be remarkably improved without decreasing the luminance of stimulated emission so much, by incorporating at least one alkali metal selected from the group consisting of potassium, rubidium and cesium within a specific amount range thereinto, to accomplish the invention.

The phosphor of the present invention is a divalent europium activated barium fluorohalide phosphor containing sodium halide and at least one alkali metal, and having the formula (I):

$$BaFX \cdot aNaX':xEu^{2+},yM' \qquad (I)$$

in which each of X and X' is at least one halogen selected from the group consisting of Cl, Br and I; $M'$ is at least one alkali metal selected from the group consisting of K, Rb and Cs; and a, x and y are numbers satisfying the conditions of $0 < a \leq 2.0$, $0 < x \leq 0.2$ and $5 \times 10^{-4} \leq y \leq 10^{-2}$, respectively.

The radiation image storage panel of the present invention comprises a support and a stimulable phosphor layer provided thereon, in which the stimulable phosphor layer contains the divalent europium activated barium fluorohalide phosphor having the above formula (I).

More in detail, the invention is accomplished on the SO finding that the divalent europium activated barium fluorohalide phosphor having the formula (I) has the prominently improved afterglow characteristics of stimulated emission particularly in a period of approx. $10^{-3}-10^{-2}$ sec. after excitation with stimulating rays.

For a phoshor improved in the afterglow characteristics of spontaneous emission, there is disclosed in Japanese Patent Publication No. 53(1978)-18470, a divalent europium activated fluorohalide phosphor which has the formula:

$$Ba_{1-x-y}Eu_xSr_yFQ$$

in which Q is at least one element selected from the group consisting of Br, Cl and I; x and y are numbers satisfying the conditions of $0.0001 \leq x \leq 0.2$ and $0 \leq y \leq 0.8$, respectively, and which contains potassium or rubidium in the crystal structure thereof in the amount enough to reduce the afterglow of spontaneous emission. For the phosphor employed in the conventional radiographic intensifying screen as described in the above Publication, it is in question to improve the afterglow characteristics in a period of several tens seconds after exposure to X-rays including the period of time required for exchanging a radiographic film.

However, the present invention brings about the improvement of the afterglow characteristics of stimulated emission of the divalent europium activated barium fluorohalide phosphor containing sodium halide, and in the case that the stimulable phosphor is employed in the radiation image storage panel, it is in question to improve the afterglow characteristics in a period of $10^{-3}-10^{-1}$ secs. after excitation with stimulating rays in such a read-out operation of the panel as aforedescribed. Therefore, the improvement of afterglow characteristics in the invention relates to the stimulated emission whose mechanism is different from that of the spontaneous emission and the decay time of the afterglow to be improved is quite different therebetween.

It has been further confirmed that the phosphor having the above formula (I) of the invention gives stimulated emission at the same level or not so lower than the phosphor containing no alkali metal represented by $M'$ (i.e., the divalent europium activated barium fluorohalide phosphor containing only sodium halide), when excited with an electromagnetic wave within a wavelength region of 450–900 nm after exposure to a radiation such as X-rays.

Accordingly, an image of high quality can be stably obtained in the radiation image recording and reproducing method without much decreasing the sensitivity thereof, by using the radiation image storage panel of the present invention employing the above-mentioned divalent europium activated barium fluorohalide phosphor.

DETAILED DESCRIPTION OF THE INVENTION

The divalent europium activated barium fluorohalide phosphor of the present invention has the formula (I):

$$BaFX.aNaX':xEu^{2+},yM' \qquad (I)$$

in which each of X and X' is at least one halogen selected from the group consisting of Cl, Br and I; $M'$ is at least one alkali metal selected from the group consisting of K, Rb and Cs; and a, x and y are numbers satisfying the conditions of $0 < a \leq 2.0$, $0 < x \leq 0.2$ and $5 \times 10^{-4} \leq y \leq 10^{-2}$, respectively.

The phosphor of the invention having the formula (I) gives stimulated emission when excited with an electromagnetic wave having a wavelength within the region of 450–900 nm after exposure to a radiation such as X-rays. From the viewpoint of improving the luminance of stimulated emission and the afterglow characteristics thereof, $M'$ in the formula (I) which indicates alkali metal is preferably potassium and the number for y indicating the amount of alkali metal is preferably within the range of $8 \times 10^{-4} \leq y \leq 5 \times 10^{-3}$. From the viewpoint of the luminance of stimulated emission, NaX' which indicates sodium halide is preferably NaBr, and the number for a indicating the amount of sodium halide is preferably within the range of $10^{-5} \leq a \leq 5 \times 10^{-1}$ and more preferably $5 \times 10^{-4} \leq a \leq 10^{-2}$.

From the same viewpoint, X indicating halogen is preferably at least one element selected from the group consisting of Br and I. The stimulation spectrum of the phosphor of the invention is shown in the wavelength region of 450–900 nm as described above, and its peak shifts toward the longer wavelength side in such an order of halogen X as Cl, Br and I depending upon kind of the halogen X. Accordingly, further from the viewpoint of matching with a source of stimulating rays such as a He-Ne laser (633 nm) and a semiconductor laser (infrared rays) which are now proposed for employment in practical use, X in the formula (I) is preferably Br, I or a combination thereof. From the viewpoint of both the luminance of stimulated emission and afterglow characteristics, the number for x in the formula (I) which indicates the amount of europium activator is preferably within the range of $10^{-5} \leq x \leq 10^{-2}$.

Figure 2:
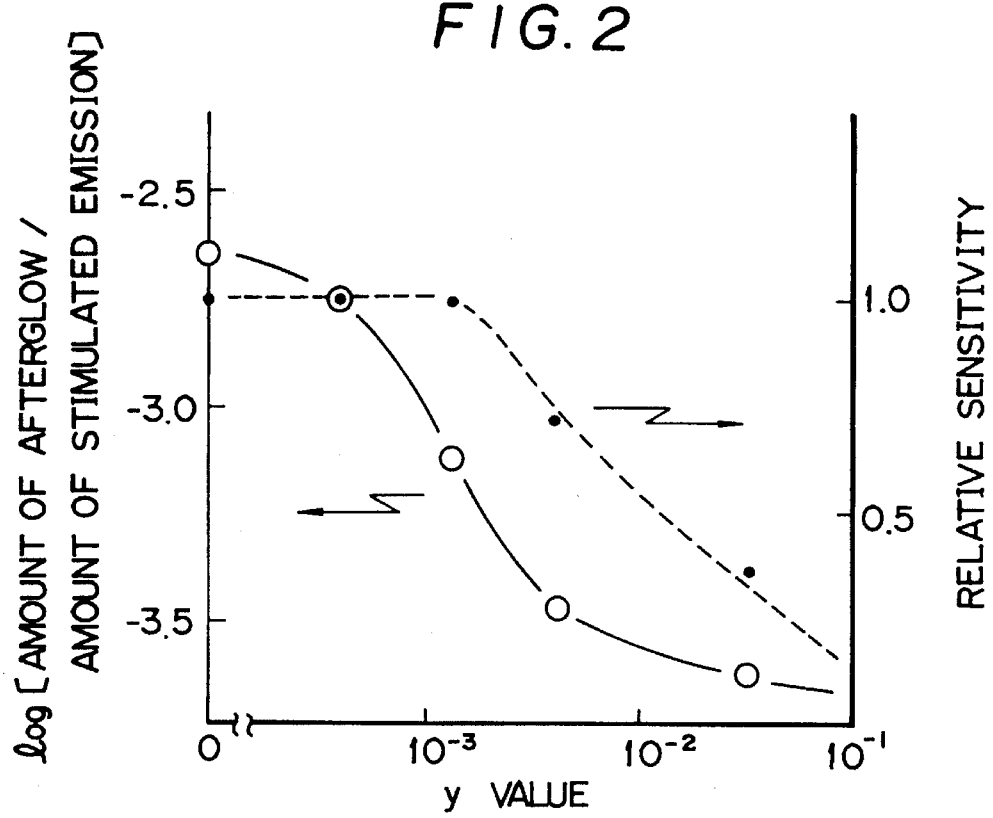
FIG. 2 graphically shows a relationship between an amount of potassium (y value) and a relative amount of afterglow (solid curve), and a relationship between y value and a relative sensitivity (dotted curve) with respect to the radiation image storage panel containing BaFBr.0.0023NaBr:0.001Eu$^{2+}$,yK phosphor.

A radiation image storage panel having a phosphor layer which comprises $BaFBr.0.002NaBr:0.001Eu^{2+},yK$ phosphor (an example of the phosphor of the present invention) dispersed in a binder has a relationship between y value indicating an amount of potassium and an amount of afterglow, and a relationship between the y value and a sensitivity (i.e., luminance of stimulated emission ) as shown in FIG. 2.

In FIG. 2, a solid curve indicates a relationship between y value and a relative amount of afterglow (logarithmic value of [amount of afterglow / amount of stimulated emission]) measured at $2 \times 10^{-3}$ sec. after scanning with stimulating rays, and a dotted curve indicates a relationship between y value and a relative sensitivity.

As is evident from FIG. 2, the radiation image storage panel containing the $BaFBr.0.0023NaBr:0.001Eu^{2+},yK$ phosphor is improved in the afterglow characteristics (that is, the relative amount of afterglow is reduced) when the amount of potassium (y value) is less than $5 \times 10^{-4}$. In contrast, when the y value exceeds $10^{-2}$, the sensitivity of the panel is extremely lowered though the afterglow characteristics are improved. Particularly in the range of $8 \times 10^{-4} \leq y \leq 5 \times 10^{-3}$, the panel is remarkably improved in the afterglow characteristics with slightly lowering the sensitivity.

It has been further confirmed that radiation image storage panels employing other divalent europium activated barium fluorohalide phosphors having the formula (I) than the above-mentioned one have the same tendencies on the afterglow characteristics and sensitivity as described above.

The amount of alkali metal (y value) contained in the phosphor is preferred to be small from the viewpoint of absorption efficiency of the resulting phosphor to a radiation such as X-rays and hygroscopic property thereof. Considering these facts, the y value range ($5 \times 10^{-4} \leq y \leq 10^{-2}$) for the phosphor of the invention is decided.

The divalent europium activated barium fluorohalide phosphor of the present invention basically has the above-mentioned formula (I), and other various components may be further incorporated into the phosphor in the preparation thereof, so far as they do not reduce the effect based on the incorporation of alkali metal $M^I$ (i.e., the improvement of afterglow characteristics). Phosphors containing such additive components are included in the phosphor of the invention. Examples of the additive component include the following substances:

metal oxides as described in Japanese Patent Provisional Publication No. 55(1980)-160078;

tetrafluoroboric acid compounds as described in U.S. patent application Ser. No. 520,215;

hexafluoro compounds as described in U.S. patent application Ser. No. 502,648;

lithium halides (LiX", in which X" is at least one halogen selected from the group consisting of F, Cl, Br and I) divalent metal halides ($M^{II}X^{'''}_2$, in which $M^{II}$ is at least one divalent metal selected from the group consisting of Be and Mg; and X''' is at least one halogen selected from the group consisting of F, Cl, Br and I), and trivalent metal halides ($M^{III}X^{''''}_3$, in which $M^{III}$ is at least one trivalent metal selected from the group consisting of Al, Ga, In and Tl; and X'''' is at least one halogen selected from the group consisting of F, Cl, Br and I) , as described in U.S. patent application Ser. No. 543,326;

zirconium as described in Japanese Patent Provisional Publication No. 56(1981)-116777;

boron as described in Japanese Patent Provisional Publication No. 57(1982)-23673;

arsenic and silicon as described in Japanese Patent Provisional Publication No. 57(1982)-23675; and transition metals as described in U.S. patent application Ser. No. 535,928.

The incorporation of metal oxides as described in the above-mentioned Japanese Patent Provisional Publication No. 55(1980)-160078 is particularly effective to prevent the sintering of a phosphor in the firing stage of the preparation thereof and to enhance the luminance of stimulated emission of the phosphor and the flowability thereof. The metal oxide is generally incorporated in an amount of $5 \times 10^{-5}$–0.5 mol per 1 mol of BaFX, preferably $10^{-5}$–0.3 mol, and more preferably $10^{-4}$–0.2 mol. The preferred metal oxide are $SiO_2$ and $Al_2O_3$.

The divalent europium activated barium fluorohalide phosphor of the present invention having the abovementioned formula (I) can be prepared, for instance, by a process described below.

As the starting materials, the following materials (1) to (5) can be employed:

(1) barium fluoride;

(2) barium halide (except barium fluoride);

(3) alkali metal halide;

(4) sodium halide (except sodium fluoride); and (5) at least one compound selected from the group consisting of europium compounds such as europium halide, europium oxide, europium nitrate and europium sulfate. Further, ammonium halide may be employed as a flux.

In the first place, the above-described starting materials (1) to (5) are mixed in the stoichiometric ratio corresponding to the formula (II):

in which X, X', $M^I$, a, x and y have the same meanings as defined above.

The mixing procedure is conducted, for instance, by mixing the starting materials in the form of a suspension. From the suspension of the starting material mixture, the solvent (e.g., water) is removed to obtain a dry mixture in a solid form. The removal of solvent is preferably conducted at room temperature or not so high temperature (for instance, not higher than 200° C.) by drying under reduced pressure and/or vacuum. The mixing procedure is by no means restricted to this one.

As a modification, there may be employed a procedure of mixing the starting materials (1), (2) and (5) in the form of a suspension, drying the suspension and then adding the alkali metal halide (8) and sodium halide (4) to the dry mixture.

In the second place, the obtained dry mixture is finely pulverized, and the pulverized mixture is then placed in a heat-resistant container such as a quartz boat or an alumina crucible and fired in an electric furnace. The firing procedure is conducted at a temperature of 500°–1800° C. for 0.5–6 hours under a weak reducing atmosphere such as a nitrogen gas atmosphere containing a small amount of hydrogen gas or a carbon dioxide gas atmosphere containing carbon monoxide gas. When the employed europium compound contains trivalent europium, the trivalent europium is reduced to divalent europium under the weak reducing atmosphere in the firing stage.

After firing the mixture of starting materials for the phosphor as described above, the fired product is taken out of the electric furnace, allowed to stand for cooling and pulverized. The pulverized product may be further fired (second firing). The second firing is conducted at a temperature of 500°–800° C. for 0.5–12 hours in an inert atmosphere such as a nitrogen gas atmosphere or an argon gas atmosphere, or in the abovementioned weak reducing atmosphere.

After the firing is complete, a powdery phosphor is obtained. The obtained phosphor may be processed in a conventional manner involving a variety of procedures for the preparation of phosphors such as a washing procedure, a drying procedure and a sieving procedure, if desired.

In the case that the phosphor of the present invention contains such additive components as described above, the additive components are incorporated into the suspension in the mixing procedure of the starting materials for the phosphor or into the dry mixture prior to the firing stage.

The above-described process gives the divalent europium activated barium fluorohalide phosphor having the aforementioned formula (I).

The radiation image storage panel of the present invention will be described hereinafter.

The radiation image storage panel basically comprises a support and a phosphor layer provided thereon, which comprises a binder and a stimulable phosphor dispersed therein. The phosphor layer can be formed on the support, for instance, by the following procedure.

In the first place, the particles of stimulable phosphor having the formula (I) and a binder are added to an appropriate solvent, and then they are mixed to prepare a coating dispersion which comprises the phosphor particles homogeneously dispersed in the binder solution.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinylchloride copolymer, polymethyl methacrylate, vinyl chloride-vinyl acetate copolymer, polyurethane, cellulose acetate butyrate, polyvinyl alcohol, and linear polyester. Among these binders, particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The mixing ratio of the binder to the stimulable phosphor in the coating dispersion can be determined according to the characteristics of the aimed radiation image storage panel and the nature of the phosphor employed. Generally, the ratio is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of a support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of the phosphor layer. The thickness of the phosphor layer varies depending upon the characteristics of the aimed radiation image storage panel, the nature of the phosphor, the ratio of the binder to the phosphor, etc. In general, the thickness of the phosphor layer is within a range of from 20 μm to 1 mm, and preferably within a range of from 50 to 500 μm.

The phosphor layer can be provided onto the support by the methods other than that given in the above. For instance, the phosphor layer is initially prepared on a sheet material such as a glass plate, a metal plate or a plastic sheet using the aforementioned coating dispersion and then thus prepared phosphor layer is superposed on the genuine support by pressing or using an adhesive agent.

The phosphor layer may consist of either a single layer or plural (two or more) layers. In the case of two or more phosphor layers, at least one layer contains the aforementioned divalent europium activated barium fluoro-halide phosphor. In any cases of a single and plural layers, a variety of known stimulable phosphors can be employed in combination with the above phosphor.

The support material employed in the present invention can be selected from those employable for the radiographic intensifying screens in the conventional radiography or those employable for the known radiation image storage panel. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a conventional radiation image storage panel, one or more additional layers are occasionally provided between the support and the phosphor layer so as to enhance the bonding strength between the support and the phosphor layer, or to improve the sensitivity of the panel or the quality of an image provided thereby (sharpness and graininess). For instance, a subbing layer or an adhesive layer may be provided by coating polymer material such as gelatin over the surface of the support on the phosphor layer-side. Otherwise, a light-reflecting layer or a light-absorbing layer may be provided by forming a polymer material layer containing a light-reflecting material such as titanium dioxide or a light-absorbing material such as carbon black. In the present invention, one or more of these additional layers may be provided on the support.

As described in U.S. patent application Ser. No. 496,278, the phosphor layer-side surface of the support (or the surface of an adhesive layer, light-reflecting layer, or light-absorbing layer in the case where such layers provided on the phosphor layer) may be provided with protruded and depressed portions for the enhancement of the sharpness of resulting image.

The radiation image storage panel generally has a transparent protective film on a free surface of a phosphor layer (not facing a support) to protect the phosphor layer from physical and chemical deterioration. In the radiation image storage panel of the present invention, it is preferable to provide a transparent protective film for the same purpose.

The protective film can be provided onto the phosphor layer by coating the surface of the phosphor layer with a solution of a transparent polymer such as a cellulose derivative (e.g., cellulose acetate or nitrocellulose), or a synthetic polymer (e.g., polymethyl methacrylate, polyvinyl butyral, polyvinyl formal, polycarbonate, polyvinyl acetate, or vinyl chloride-vinyl acetate copolymer), and drying the coated solution. Alternatively, the protective film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approx. 3 to 20 µm.

For the enhancement of sharpness of the resulting image, at least a portion of the radiation image storage panel may be colored with a colorant, as described in U.S. Pat. No. 4,394,581 and U.S. patent application Ser. No. 326,642. For the same purpose, the phosphor layer of the radiation image storage panel according to the present invention may contain a white powder, as described in U.S. Pat. No. 4,350,893.

The present invention will be illustrated by the following examples and comparison examples, but these examples by no means restrict the invention.

EXAMPLE 1

To 500 cc of distilled water ($H_2O$) were added 175.34 g. of barium fluoride ($BaF_2$), 333.18 g. of barium bromide ($BaBr_2 \cdot 2H_2O$), and 0.783 g. of europium bromide ($EuBr_3$), and they were mixed to give a suspension. The suspension was dried at 60° C. under reduced pressure for 3 hours and further dried at 150° C. under vacuum for another 3 hours. The dry product was finely pulverized in a mortar. To 100 g. of thus pulverized product were then added 0.05 g. of potassium bromide (KBr) and 0.1 g. of sodium bromide (NaBr), and they were mixed to prepare a mixture of starting materials for a phosphor.

Then, the mixture of the starting materials was placed in an alumina crucible, which was, in turn, placed in a high-temperature electric furnace for firing. The firing was done at 900° C. for 1.5 hours in a carbon dioxide gas atmosphere containing carbon monoxide gas. After the firing was complete, the crucible was taken out of the furnace and allowed to stand for cooling. The fired product was pulverized to obtain a powdery divalent europium activated barium fluorobromide phosphor ($BaFBr \cdot 0.0023NaBr:0.001Eu^{2+}$, 0.001K).

Further, a variety of divalent europium activated barium fluorobromide phosphors were obtained by varying the amount of potassium bromide within the range of $10^{-4}$ – $10^{-1}$ mol per 1 mol of BaFBr in the above-described preparation of the phosphor.

Subsequently, using the obtained phosphors, a variety of radiation image storage panels were prepared in the following manner.

To a mixture of the phosphor particles and a linear polyester resin were successively added methyl ethyl ketone and nitrocellulose (nitrification degree: 11.5%), to prepare a dispersion containing the phosphor particles. Then, tricresyl phosphate, n-butanol and methyl ethyl ketone were added to the dispersion, and the mixture was sufficiently stirred by means of a propeller agitater to obtain a homogeneous coating dispersion containing the binder and the phosphor particles in the ratio of 1:20 (binder:phosphor, by weight) and having a viscosity of 25–35 PS (at 25° C.).

Then, the coating dispersion was applied onto a polyethylene terephthalate sheet containing carbon black (support, thickness: 250 µm) placed horizontally on a glass plate. The application of the coating dispersion was carried out using a doctor blade. After the coating was complete, the support having the coating dispersion was placed in an oven and heated at a temperature gradually rising from 25° to 100° C. Thus, a phosphor layer having the thickness of approx. 200 µm was formed on the support.

On the phosphor layer was placed a transparent polyethylene terephthalate film (thickness: 12 µm; provided with a polyester adhesive layer) to combine the film and the phosphor layer with the adhesive layer, Thus, a radiation image storage panel consisting essentially of a support, a phosphor layer and a transparent protective film was prepared.

COMPARISON EXAMPLE 1

The procedure of Example 1 was repeated except for adding no potassium bromide to obtain a powdery divalent europium activated barium fluorobromide phosphor ($BaFBr \cdot 0.0023NaBr:0.001Eu^{2+}$).

Using thus obtained phosphor particles, a radiation image storage panel consisting essentially of a support, a phosphor layer and a transparent protective film was prepared in the same manner as described in Example 1.

The radiation image storage panels prepared in Example 1 and Comparison Example 1 were evaluated on the sensitivity and the afterglow characteristics according to the following tests.

(1) Sensitivity

The radiation image storage panel was excited with a He-Ne laser beam (wavelength: 632.8 nm) after exposure to a radiation at 80 KVp to measure the sensitivity thereof.

(2) Afterglow Characteristics

The radiation image storage panel was cut to give a test strip having a width of 7 cm. The test strip was exposed to X-rays at 80 KVp and subsequently once scanned with a He-Ne laser beam (wavelength: 632.8 nm) in the direction of its width for $5\times10^{-3}$ sec. to measure the decay of afterglow of the stimulated emission.

Figure 1:
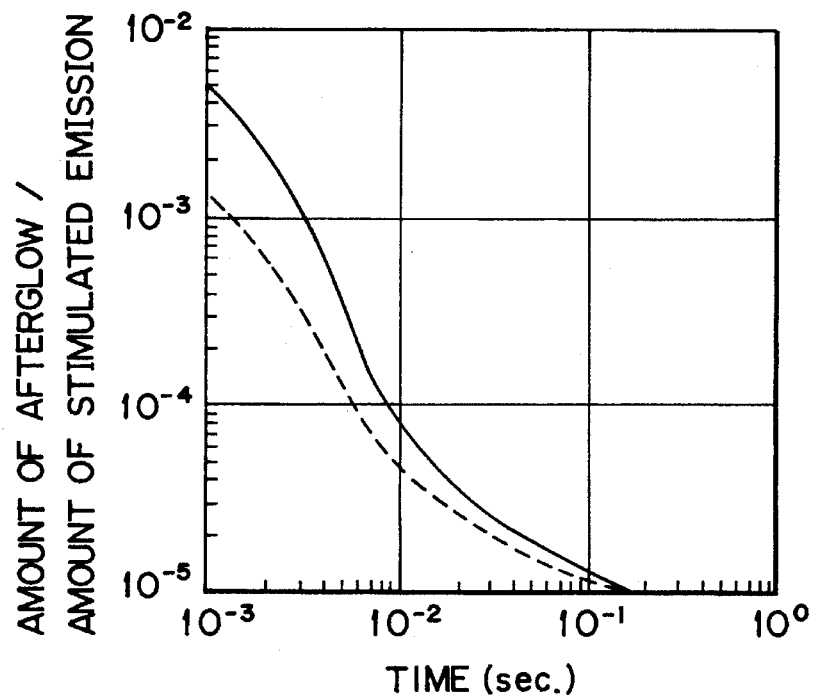
FIG. 1 graphically shows the afterglow characteristics of a radiation image storage panel containing BaFBr·0.0023NaBr:0.001Eu$^{2+}$, 0.001K phosphor according to the present invention (dotted curve), and of a radiation image storage panel for comparison containing BaFBr.0.0023 NaBr:0.001Eu$^{2+}$phosphor (solid curve).

The results of the evaluation on the sensitivity and afterglow characteristics are graphically illustrated in FIGS. 1 and 2.

FIG. 1 illustrates graphs (decay curves of afterglow) in which the time is plotted as the abscissa and [amount of afterglow/amount of stimulated emission] as the ordinate, Dotted curve: the radiation image storage panel containing BaFBr.0.0023NaBr:0.001Eu$^{2+,}$ 0.001K phosphor, and Solid curve: the radiation image storage panel containing BaFBr.0.0023NaBr:0.001Eu$^{2+}$ phosphor.

FIG. 2 illustrates graphs on BaFBr.0.0023NaBr: 0.001Eu$^{2+}$,yK phosphor, in which Solid curve indicates a relationship between the amount of potassium (y value) and the logarithmic value of [amount of afterglow/amount of stimulated emission], and Dotted curve indicates a relationship between the amount of potassium (y value) and the relative sensitivity.

In FIG. 2, the amount of afterglow is a value measured at $2\times10^{-3}$ sec. after excitation with a He-Ne laser beam.

EXAMPLE 2

The procedure of Example 1 was repeated except for adding 0.15 g. of silicon dioxide (SiO$_2$) in addition to potassium bromide and sodium bromide to 100 g. of the pulverized product, to obtain a powdery divalent europium activated barium fluorobromide phosphor (BaFBr.0.0023NaBr. 0.006SiO$_2$:0.001Eu$^{2+}$, 0.001K).

Using thus obtained phosphor particles, a radiation image storage panel consisting essentially of a support, a phosphor layer and a transparent protective film was prepared in the same manner as described in Example 1.

The radiation image storage panel prepared in Example 2 was evaluated on the sensitivity and the afterglow characteristics by the above-described tests.

As a result, the relative sensitivity and the logarithmic value of [amount of afterglow/amount of stimulated emission] were respectively 1.2 and −3.1 for the radiation image storage panel containing BaFBr.0.0023NaBr .0.006SiO$_2$:0.001Eu$^{2+}$, 0.001K phosphor, though those were 1.0 and −2.6 for the radiation image storage panel of Comparison Example 1 containing BaFBr.0.0023NaBr: 0.001Eu$^{2+}$ phosphor (see FIG. 2).

EXAMPLE 3

The procedure of Example 1 was repeated except for using 0.07 g. of rubidium bromide (RbBr) instead of potassium bromide to obtain a powdery divatent europium activated barium fluorobromide phosphor (BaFBr.0.0023NaBr: 0.001Eu$^{2+}$, 0.001Rb).

Using thus obtained phosphor particles, a radiation image storage panel consisting essentially of a support, a phosphor layer and a transparent protective film was prepared in the same manner as described in Example 1.

The radiation image storage panel prepared in Example 3 was evaluated on the sensitivity and the afterglow characteristics by the above-described tests.

As a result, the relative sensitivity and the logarithmic value of [amount of afterglow/amount of stimulated emission] were respectively 1.0 and −3.3 for the panel containing BaFBr.0.0023NaBr:0.001Eu$^{2+}$, 0.001Rb phosphor, though those were 1.0 and −2.6 for the panel of Comparison Example 1 containing BaFBr.0.0023NaBr: 0.001Eu$^{2+}$ phosphor (see FIG. 2).

EXAMPLE 4

The procedure of Example 1 was repeated except for using 0.09 g. of cesium bromide (CsBr) instead of potassium bromide to obtain a powdery divalent europium activated barium fluorobromide phosphor (BaFBr.0.0023NaBr: 0.001Eu$^{2+}$, 0.001Cs).

Using thus obtained phosphor particles, a radiation image storage panel consisting essentially of a support, a phosphor layer and a transparent protective film was prepared in the same manner as described in Example 1.

The radiation image storage panel prepared in Example 4 was evaluated on the sensitivity and the afterglow characteristics by the above-described tests.

As a result, the relative sensitivity and the logarithmic value of [amount of afterglow/amount of stimulated emission] were respectively 1.0 and −2.9 for the panel containing BaFBr.0.0023NaBr:0.001Eu$^{2+}$, 0.001Cs phosphor, though those were 1.0 and −2.6 for the panel of Comparison Example 1 containing BaFBr.0.0023NaBr: 0.001Eu$^{2+}$ phosphor (see FIG. 2).

We claim:

1. A divalent europium activated barium fluorohalide phosphor having the formula (I):

$$BaFX.aNaX':xEu^{2+},yM^I \qquad (I)$$

in which each of X and X' is at least one halogen selected from the group consisting of Cl, Br and I; M$^I$ is at least one alkali metal selected from the group consisting of K, Rb and Cs; and a, x and y are numbers satisfying the conditions of $0<a\leq2.0$, $0<x\leq0.2$ and $5\times10^{-4}\leq y \leq 10^{-2}$, respectively.

2. The phosphor as claimed in claim 1, in which y in the formula (I) is a number satisfying the condition of $8\times10^{-4}\leq y\leq5\times10^{-3}$.

3. The phosphor as claimed in claim 1, in which M$^I$ in the formula (I) is K.

4. The phosphor as claimed in claim 1, in which a in the formula (I) is a number satisfying the condition of $10^{-5}\leq a\leq5\times10^{-1}$.

5. The phosphor as claimed in claim 4, in which a in the formula (I) is a number satisfying the condition of $5\times10^{-4}\leq a\leq 10^{-2}$.

6. The phosphor as claimed in claim 1, in which X in the formula (I) is at least one halogen selected from the group consisting of Br and I.

7. The phosphor as claimed in claim 1, in which X' in the formula (I) is Br.

8. A radiation image storage panel comprising a support and a stimulable phosphor layer provided thereon, characterized in that said stimulable phosphor layer contains a divalent europium activated barium fluorohalide phosphor having the formula (I ):

$$BaFX.aNaX':xEu^{2+}, yM^I \qquad (I)$$

in which each of X and X' is at least one halogen selected from the group consisting of Cl, Br and I; M$^I$ is at least one alkali metal selected from the group consisting of K, Rb and Cs; and a, x and y are numbers satisfying the conditions of $0<a\leq2.0$, $0\leq x\leq0.2$ and $5\times10^{-4}\leq y \leq 10^{-2}$, respectively.

9. The radiation image storage panel as claimed in claim 8, in which y in the formula (I) is a number satisfying the condition of $8\times10^{-4}\leq y\leq5\times10^{-3}$.

10. The radiation image storage panel as claimed in claim 8, in which $M^I$ in the formula (I) is K.

11. The radiation image storage panel as claimed in claim 8, in which a in the formula (I) is a number satisfying the condition of $10^{-5} \leq a \leq 5 \times 10^{-1}$.

12. The radiation image storage panel as claimed in claim 11, in which a in the formula (I) is a number satisfying the condition of $5 \times 10^{-4} \leq a \leq 10^{-2}$.

13. The radiation image storage panel as claimed in claim 8, in which X in the formula (I) is at least one halogen selected from the group consisting of Br and I.

14. The radiation image storage panel as claimed in claim 8, in which X' in the formula (I) is Br.

* * * * *